United States Patent
Narita et al.

(10) Patent No.: US 8,175,795 B2
(45) Date of Patent: May 8, 2012

(54) ROUTE SEARCH APPARATUS

(75) Inventors: Masayuki Narita, Kariya (JP); Akira Tsukamoto, Kariya (JP)

(73) Assignee: Denso Corporation, Kariya (JP)

( * ) Notice: Subject to any disclaimer, the term of this patent is extended or adjusted under 35 U.S.C. 154(b) by 854 days.

(21) Appl. No.: 12/232,912

(22) Filed: Sep. 25, 2008

(65) Prior Publication Data

US 2009/0082952 A1    Mar. 26, 2009

(30) Foreign Application Priority Data

Sep. 26, 2007  (JP) ................................ 2007-249192

(51) Int. Cl.
*G01C 21/00*    (2006.01)
(52) U.S. Cl. ............ 701/202; 701/1; 701/200; 701/201; 701/115; 340/995.19
(58) Field of Classification Search .................. 701/201, 701/115, 1, 200; 340/995.19
See application file for complete search history.

(56) References Cited

U.S. PATENT DOCUMENTS

| | | | | |
|---|---|---|---|---|
| 5,742,922 A | * | 4/1998 | Kim | 701/201 |
| 6,005,494 A | * | 12/1999 | Schramm | 340/995.19 |
| 6,151,549 A | * | 11/2000 | Andrews et al. | 701/115 |
| 6,711,474 B1 | * | 3/2004 | Treyz et al. | 701/1 |
| 7,783,417 B2 | * | 8/2010 | Vavrus | 701/200 |
| 8,082,102 B2 | * | 12/2011 | Ravenscroft | 701/301 |

FOREIGN PATENT DOCUMENTS

| | | |
|---|---|---|
| JP | A-HI0-197272 | 7/1998 |
| JP | A-2000-002553 | 7/2000 |
| JP | A-2003-148982 | 5/2003 |
| JP | A-2003-316884 | 11/2003 |
| JP | 2005030823 A * | 2/2005 |
| JP | A-2005-030823 | 2/2005 |
| JP | A-2006-088820 | 4/2006 |
| JP | A-2006-146465 | 6/2006 |
| JP | A-2007-066183 | 3/2007 |

OTHER PUBLICATIONS

A. Sbihi, R.W. Eglese; The relationship between vehicle routing and scheduling and green logistics.*
Dessouky, Rahimi, Weidner; Jointly optimizing cost, service and environmental performance in demand-responsive transit scheduling, University of South Carolina, Daniel Epstein Department of Industrial and Systems Engineering.*

(Continued)

*Primary Examiner* — Dilek B Cobanoglu
(74) *Attorney, Agent, or Firm* — Posz Law Group, PLC

(57) ABSTRACT

An apparatus calculates a coefficient b that reflects a road slope condition of each section based on an altitude difference of both ends of each section stored in a memory, and identifies a carbon dioxide discharge amount that changes in proportion to the distance of each section by multiplying a distance D of each section by the coefficient b and another coefficient Ec. Further, the apparatus identifies a discharge amount that changes in proportion to a travel time of each section by multiplying a travel time T of each section and yet another coefficient a, and identifies a discharge amount based on an index that changes in proportion to the number of stops in each section by multiplying an index AEE by the coefficient Ec and still yet another coefficient c for performing a carbon-conscious routing between a start place and a destination.

8 Claims, 7 Drawing Sheets

OTHER PUBLICATIONS

Choi, Tcha; A column generation approach to the heterogeneous fleet vehicle routing problem.*
Google search results.*
Proceeding of Civil Engineering Society, No. 695/IV-54,125-136, 2002.1 (discussed on p. 1 of Specification).

Office Action mailed Sep. 15, 2009 from the Japan Patent Office for corresponding patent application No. 2007-249192 (English translation enclosed).
Office Action mailed Sep. 8, 2011 in corresponding CN application No. 200810161741.2 (and English translation).

* cited by examiner

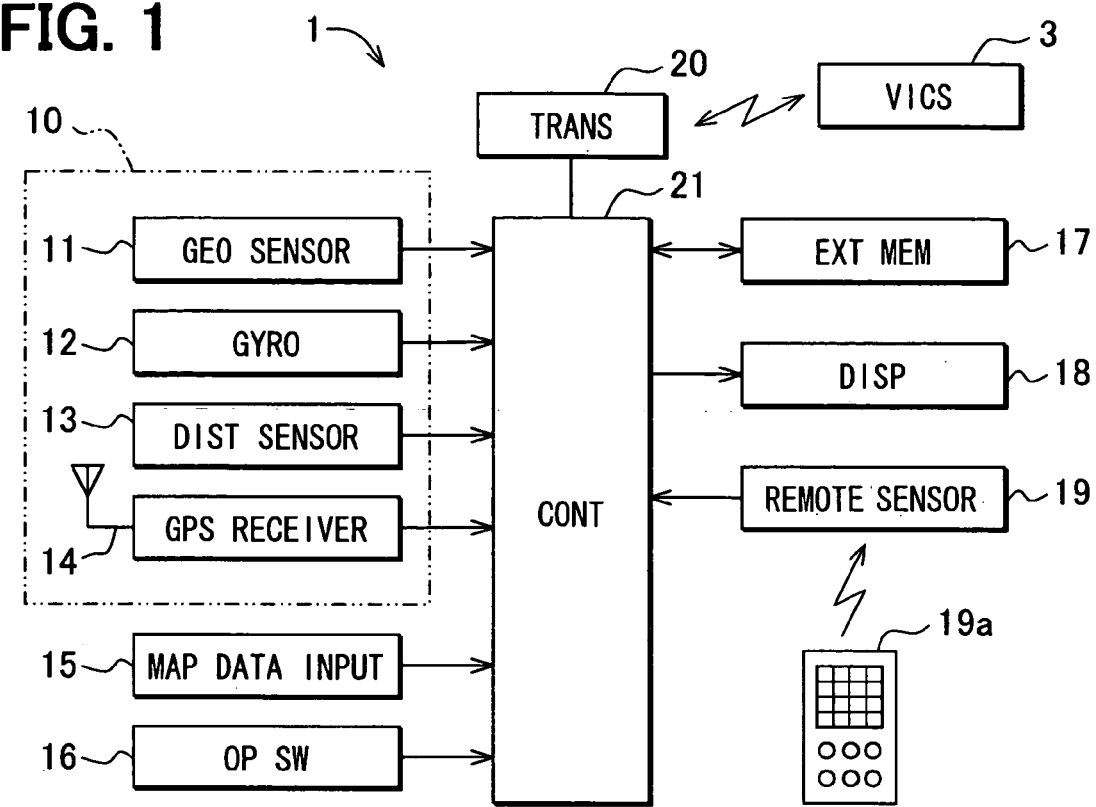
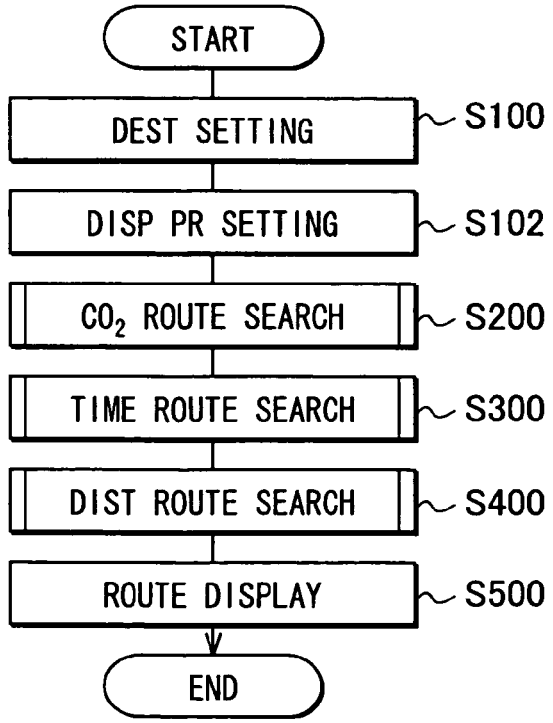

FIG. 6
| No. | aT | bD | cAEE | Q |
|---|---|---|---|---|
| 1 | 21.42857 | 16.4879 | 9.146341 | 47.06281 |
| 2 | 4.761905 | 1.434146 | 9.146341 | 15.34239 |
| 3 | 4.347826 | 2.15122 | 9.146341 | 15.64539 |
| 4 | 4.761905 | 0 | 9.146341 | 13.90825 |
| 5 | 6.521739 | 3.226829 | 9.146341 | 18.89491 |
| 6 | 21.42857 | 16.4879 | 9.146341 | 47.06281 |
| 7 | 2.898551 | 1.434146 | 9.146341 | 13.47904 |
| 8 | 21.42857 | 2.15122 | 9.146341 | 32.72613 |
| 9 | 4.761905 | 0 | 9.146341 | 13.90825 |
FIG. 7
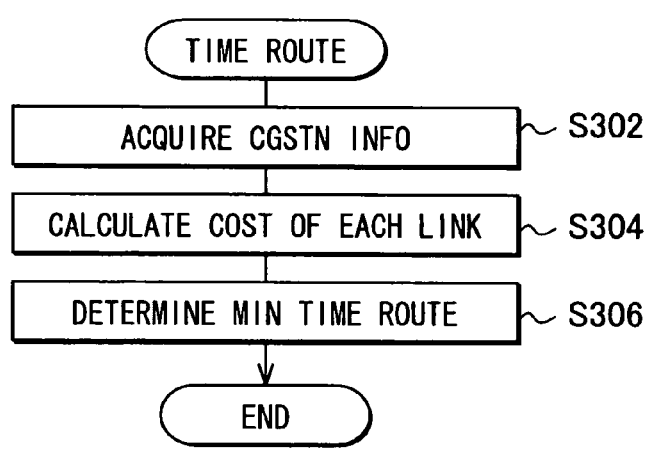
FIG. 8
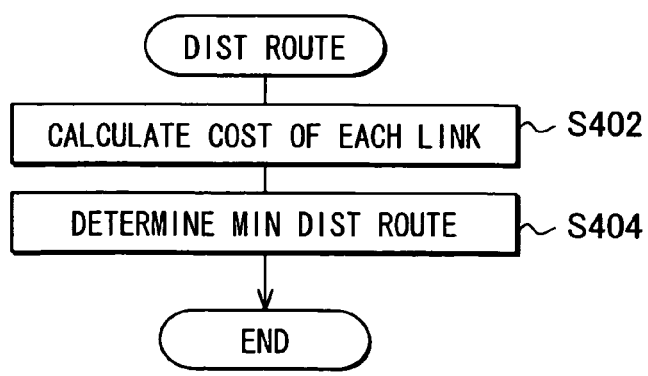

ROUTE SEARCH APPARATUS

CROSS REFERENCE TO RELATED APPLICATION

The present application is based on and claims the benefit of priority of Japanese Patent Application No. 2007-249192 filed on Sep. 26, 2007, the disclosure of which is incorporated herein by reference.

FIELD OF THE INVENTION

The present disclosure generally relates to a route search apparatus for searching for a route from a start place to a destination.

BACKGROUND INFORMATION

Conventionally, a route search apparatus for searching for and displaying a carbon dioxide discharge minimum route between a start place and a destination that minimizes the discharge of the carbon dioxide based on map information and a carbon dioxide discharge data for each link in the route. The carbon dioxide discharge data for each is calculated based on an index that is derived from greenhouse gas measurement data as well as a travel time of each link and the map information, and is stored in a memory of the apparatus. The route search apparatus for searching for such a route is, for example, disclosed in Japanese patent document JP-A-2005-03823.

Further, a technique for estimating the carbon dioxide discharged from a travel of a vehicle based on a calculation of a fuel consumption of each link by an equation is disclosed in, for example, a non-patent document "Proceeding of Civil Engineering Society (No. 695/IV-54, 125-136, 2002.1)." The equation for the above calculation is Fuel consumption $Q=0.3T+0.028D+0.056AEE$ T: Travel time, D: Travel distance, AEE: Acceleration energy The apparatus disclosed in the above patent document calculates the carbon dioxide discharge amount for each link based on a travel speed in each link, and the travel speed in each link is calculated based on traffic information received through communication and a travel distance of each link derived from map information. That is, the carbon dioxide discharge amount calculated in the above patent document does not reflect an influence of a travel time, a travel distance and the like of each link, thereby leading to an inaccuracy of the calculation of the carbon dioxide discharge amount.

Therefore, the equation in the above non-patent document may be employed for quantitatively calculating the carbon dioxide discharge amount for each link. However, the equation does not consider an influence of a slope of the road, the calculation disclosed in the non-patent document does not yet achieve a sufficient calculation accuracy.

SUMMARY OF THE INVENTION

In view of the above and other problems, the present invention provides an apparatus for accurately calculating a carbon dioxide discharge amount.

In an aspect of the present invention, a route search apparatus includes: a calculation unit calculating a carbon dioxide discharge amount being discharged from an internal combustion engine of a vehicle per section in a route from a start place to a destination; a carbon-conscious routing unit searching a carbon-minimum route that minimizes the carbon dioxide discharge amount in the route from the start place to the destination based on a calculation by the calculation unit; and a memory unit memorizing altitude information that represents an altitude difference between both ends of each section in the route. The calculation unit identifies a slope coefficient that reflects a slope condition of each section based on the altitude difference of each section stored in the memory unit, and the calculation unit variably identifies the carbon dioxide discharge amount for each section by multiplying a distance of each section by the slope coefficient. Further, the calculation unit variably identifies the carbon dioxide discharge amount based on a travel time of the vehicle in each section, and variably identifies the carbon dioxide discharge amount based on an index that changes according to the number of stops in each section, for a purpose of calculating a total carbon dioxide discharge amount for each section based on an addition of each of above-identified carbon dioxide discharge amounts.

The apparatus of the present invention calculates the carbon dioxide discharge amount by (1) adding up the discharge amounts of each section after calculating the coefficient reflecting the slope condition of each section based on the altitude difference in the memory unit, (2) identifying a variable carbon dioxide discharge amount that changes in proportion to the distance of each section by multiplying the distance of each section by the coefficient, (3) identifying a variable carbon dioxide discharge amount that changes in proportion to the travel time of each section, and (4) identifying a variable carbon dioxide discharge amount based on an index that changes in proportion to the number of stops in each section. That is, an influence of the altitude difference is quantitatively reflected to the calculation of the carbon dioxide discharge amount, thereby achieving an improved accuracy of calculation of the carbon dioxide discharge amount.

BRIEF DESCRIPTION OF THE DRAWINGS

Other objects, features and advantages of the present invention will become more apparent from the following detailed description made with reference to the accompanying drawings, in which:

FIG. 1 shows a configuration of a route search apparatus in an embodiment of the present invention;

FIG. 2 shows a flow chart of a route search process;

FIG. 6 shows a diagram for explaining a calculation example of the fuel consumption of each link;

FIG. 7 shows a flow chart of route search process that prioritizes a travel time;

FIG. 8 shows a flow chart of route search process that prioritizes a travel distance;

DETAILED DESCRIPTION

Figure 3:
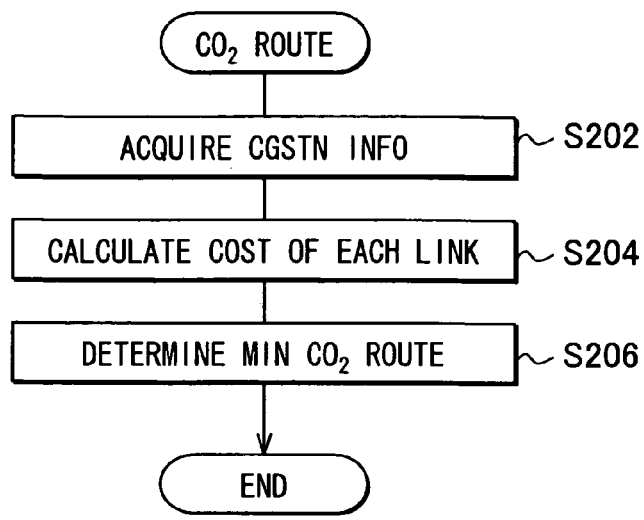
FIG. 3 shows a flow chart of a carbon dioxide discharge conscious route search process.

The configuration of a route search apparatus in one embodiment of the present invention is shown in FIG. 1. The route search apparatus of the present embodiment serves as a navigation apparatus 1.

The navigation apparatus 1 has a position sensor 10, a map data input unit 15, an operation switch group 16, an external memory 17, a display unit 18, a wireless remote sensor 19, a transceiver 20 and the control circuit 21.

The position sensor 10 outputs information to the control circuit 21 to identify a current position and a direction of the vehicle based on detection results and characteristics of sensor components such as a geomagnetism sensor 11, a gyroscope 12, a distance sensor 13, a GPS receiver 14 and the like.

As for the map data input unit 15, it is a device for reading and writing data to a nonvolatile storage medium such as a hard disk drive (HDD) which memorizes map data.

The map data includes road data representing a link distance, a road type, a number of lines, positions of traffic signals of each link as well as so-called map matching data for improving position detection accuracy, background data representing a position/shape/name of a river, a lake, a sea, a railroad, a facility or the like, facility data representing a name/position/facility type of facilities and other data.

The operation switch group 16 is a group of switches disposed at the surroundings and other positions of the display unit 18 (i.e., mechanical switches) and/or on a front face of the display unit 18 (i.e., touch switches), and outputs signals to the control circuit 21 according to user operations on those switches.

The external memory 17 is a memory formed by using the nonvolatile memory mediums such as the flash memory. The external memory 17 is different from a RAM or a ROM disposed in the control circuit 21 to be mentioned later.

On the external memory 17 in the present embodiment, various parameters that are necessary for the calculation of the carbon dioxide discharge are memorized as an eco-map. The various parameters for the calculation of the carbon dioxide discharge include information of height difference between a start point and an end point of each link, a vehicle weight, a fuel type and the like.

The display unit 18 is a display device having a liquid crystal display or the like, and displays a picture according to a video signal input from the control circuit 21.

The wireless remote sensor 19 outputs, to the control circuit 21, a signal received from a wireless remote controller 19a that transmits a radio signal through infrared rays based on the operation of the user.

The transceiver 18 is a device to transmit and receive data to/from a VICS center 3. In this case, VICS represents Vehicle Information and Communications Service available in Japan. The VICS center 3 has a database for receiving and storing probe information (link information representing a traveling link, a travel time of the link and the like) that is collected by travels of probe cars (not shown in the drawing), and provides traffic information (traffic jam information, travel time information of each link and the like) for the traveling vehicle through roadside units based on the stored probe information. In addition, the traffic jam information is provided based on three ranks of category for each link. That is, the traffic jam information is provided either as a light traffic, a heavy traffic, or a congested traffic.

When the control circuit 21 receives traffic information from VICS center 3 through the transceiver 18, received traffic information is memorized to the external memory 17.

The control circuit 21 is a computer having a CPU, a RAM, a ROM, an I/O, and the like. The CPU uses a program memorized by the ROM for performing various processing.

The various processing by the control circuit 21 includes, a current position identification process which identifies a current position and a direction of the vehicle based on information inputs from the position sensor 10, a map display process which displays a vehicle mark on a map surrounding the vehicle in the display screen of the display unit 18, a destination search process which searches for a destination according to the operation of the user, a route search process which searches for a guidance route toward the destination from a start place, a route guidance process which provides travel guidance along the guidance course and other processes.

In addition, the navigation apparatus 1 performs, as the route guidance process, a time-conscious routing for searching for a shortest route that minimizes a travel time from the start place to the destination, a distance-conscious routing for searching for a shortest route that minimizes a travel distance from the start place to the destination, and a carbon-conscious routing for searching for a carbon-minimum route that minimizes the carbon dioxide discharge amount in the route from the start place to the destination. The searched route is displayed on the display screen of the display unit 18 based on the user preference that is chosen by the user operation.

A flow chart of the route search process is shown in FIG. 2. When a destination is searched for by the destination search process, and a signal to direct the route search process for searching for a route to the destination is input according to the operation of the user, the control circuit 21 performs a process shown in FIG. 2.

First, the destination is identified at S100, and the display priority is set subsequently at S102. Setting of the display priority is a process to determine a route display priority of a route, among the time-conscious route, the distance-conscious route and the carbon-conscious route, at S500 that is mentioned later. In the present embodiment, the display priority is set as an order from the carbon-conscious route, the distance-conscious route, to the time-conscious route. The display priority can be changed according to the operation of the user.

Then, a carbon-conscious routing is performed at S200. A detailed flow chart of the carbon-conscious routing is shown in FIG. 3. First, the traffic jam information is acquired at S202 of the process. More practically, the traffic jam information is retrieved from the external memory 17.

A cost of each link is calculated next at S204. More practically, a fuel consumption amount of each link from the start place to the destination is calculated, and the carbon dioxide discharge amount is calculated by multiplying the fuel consumption amount by conversion coefficient. The calculation of the fuel consumption amount is explained in the following.

The fuel consumption amount Q of each link is calculated by using an equation 1 that combines a fuel type/displacement coefficient a, a travel time of a link T, a height difference coefficient b, a link distance D, a vehicle weight coefficient c, an acceleration energy AEE. The coefficient a is determined by the vehicle engine type and a type of the fuel. The coefficient b is determined by the height difference of the start and end point of the link. The coefficient c is determined by the road type, the number of lanes in the road, the number of traffic lights and the like.

$$Q=aT+bD+cAEE \quad \text{(Equation 1)}$$

In the equation 1, the first term represents the fuel consumption amount in an idling condition, the second term represents the fuel consumption amount in a travel at a constant speed, and the third term represents the fuel consumption amount by the acceleration from stopping to the traveling condition. The fuel consumption Q can be quantitatively calculated by summing up the first to third terms as shown in the equation 1.

In the present embodiment, the coefficient a and coefficient c are assumed to be a constant in the equation 1, and the fuel consumption Q is calculated with the coefficient b as a variable for reflecting the influence of the carbon dioxide consumption by the height difference of the traveling road.

The first term aT can be calculated as $aT=aD/v$ where D represents a distance of the link and v represents an average vehicle speed. The coefficient a is determined according to the displacement volume of the internal combustion engine of the vehicle and the fuel classification of the vehicle. When the displacement volume of the internal combustion engine of the vehicle and the fuel classification of the vehicle are input by a worker at the time of installation of the navigation apparatus 1, the displacement volume of the internal combustion engine of the vehicle and the fuel classification of the vehicle are memorized to the external memory 17 of the control circuit 21, and the coefficient a is determined based on the information stored in the memory 17. The present embodiment uses a value 0.25 for the coefficient a. In addition, in the present embodiment, the average speed v is determined as 25 kilometers per hour (6.9 meters per second) for a light traffic link where the traffic is smoothly flowing, as 15 kilometers per hour (4.2 meters per second) for a heavy traffic link where the traffic is slow, or as 5 kilometers per hour (1.4 meters per second) for a congested traffic link for calculating aT.

The coefficient b in the second terms in the equation 1 is, depending on the slope of the link, calculated as (1) a flat road, (2) an uphill road, or (3) a downhill road.

(1)

When the road is flat, the coefficient b is calculated by using a friction coefficient $\mu$, a vehicle weight m, an acceleration of gravity g. That is, $$b=\mu mg.$$

(2)

Figure 4:
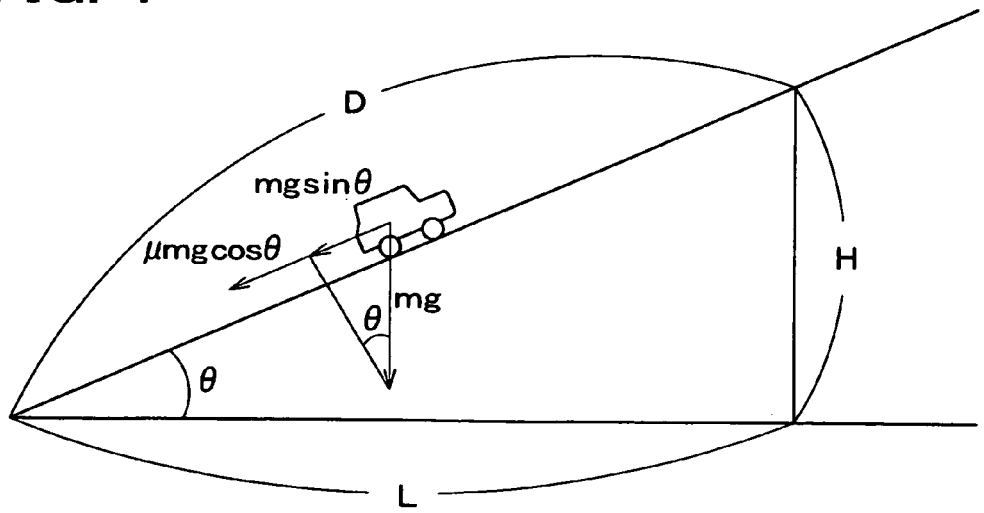
FIG. 4 shows an illustration for explaining a relation of a distance and a height difference.

When the road is uphill, the distance D is attributed to a horizontal component L and a vertical component (the height difference) H, as shown in FIG. 4, and by using a relation of $\mu mg \cos \theta + mg \sin \theta = b$, a relation of $\mu mgL + mgH = bD$ is derived. In this case, when L is calculated as $D \cos \theta$, b is represented as $b=(mg/D)(\mu D \cos \theta + H)$. Further, based on a relation of $\sin \theta = H/D$, a relation $\cos \theta = \sqrt{1-(H/D)^2}$ is derived. Therefore, the coefficient b is calculated in the following manner.

$$b=(mg/D)(\mu D\sqrt{1-(H/D)^2}+H)$$

(3)

When the road is downhill, the situation is divided into two cases. That is, a case (3-1) $\mu mgL \geq mgH$ and a case (3-2) $\mu mgL < mgH$ can be assumed.

(3-1)

When a relation $\mu mgL \geq mgH$ is assumed, a relation $mg(\mu L-H)=bD$ is derived. In this case, $L=D \cos \theta$ results in the coefficient b represented in the following manner.

$$b=(mg/D)(\mu D \cos \theta - H)$$

Further, as described above, the value $\cos \theta$ is represented as $\sqrt{1-(H/D)^2}$, the coefficient b is, $$b=(mg/D)(\mu D\sqrt{1-(H/D)^2}-H)$$

(3-2)

When a relation $\mu mgL < mgH$ is assumed, the coefficient b is, $$b=0$$

The coefficient b is calculated according to the slope of the link as mentioned above, and the coefficient b is multiplied by the distance D of the link for calculating the second term of the equation 1. In addition, the distance D of the link can be acquired from the map data, and the height difference H of the link can be calculated from the information that represents the height difference of the start point and the end point of each link stored in the external memory 17. Further, the friction coefficient $\mu$ is determined as a value of 0.01 in the present embodiment for both of the uphill case and the downhill case. The friction coefficient p may be respectively changed for the uphill case and the downhill case.

The AEE in the third term of the equation 1 is an index that changes according to the number of stops. The value cAEE is calculated in the following manner by using the average speed v. That is, $$cAEE=(\tfrac{1}{2})mv^2$$

Because the energy acquired from 1 cc of fuel is about 8200 J, the cAEE value is actually calculated as, $$cAEE=(\tfrac{1}{2})mv^2/8200$$

Further, in the present embodiment, the coefficient c is assumed to be $(\tfrac{1}{2})m$, and the average speed v is either of 25 kilometers per hour (6.9 meters per second) for the light traffic link (smooth traffic), 15 kilometers per hour (4.2 meters per second) for the heavy traffic link (slow traffic), or 5 kilometers per hour (1.4 meters per second) for the congested traffic link for calculating the cAEE.

Then, at S206, the carbon-minimum route that minimizes the total carbon dioxide (CO2) discharges for the travel from the start place to the destination is searched for. The discharge amount of the carbon dioxide is proportional to the fuel consumption, thereby being calculated by using an equation 2 in the following with a conversion coefficient of Ec.

$$E=Ec/Q=Ec(aT+bD+cAEE) \quad \text{(Equation 2)}$$

The total carbon dioxide (CO2) discharge for the route from the start place to the destination is calculated by summing up the CO2 discharge calculated by the equation 2 for each of the link in the route.

Figure 5A:
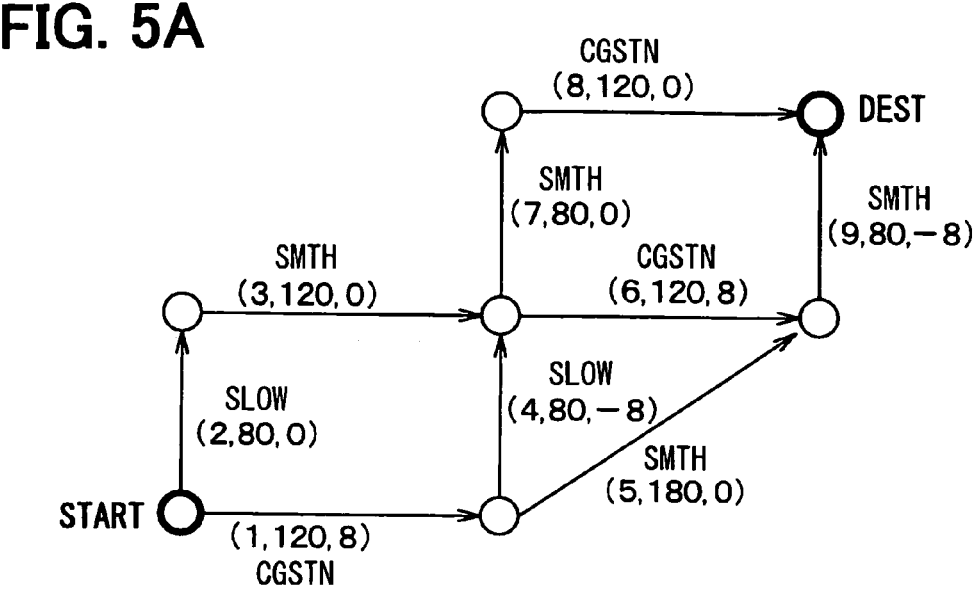
FIGS. 5A and 5B show illustrations for explaining an example calculating the fuel consumption of each link from the present position as a start place to a destination.

An example calculation of the fuel consumption of each link in the route from the start place (the present position) to the destination is explained in the following with reference to FIGS. 5A, 5B, 6. In FIG. 5A, each link is shown with its link number, link distance D, and the height difference H. For example, (1,120,8) in the drawing represents that the link has the link number 1, the link distance of 120 meters, the height difference of the both ends of the link of 8 meters. Thus, the fuel consumption Q of each ink is calculated by using the equation 1 and the numbers (the link number, link distance D, height difference H) in the parenthesis.

FIG. 6 shows an example that lists calculations of the fuel consumption Q of each link by using the equation 1. In the example of FIG. 6, $\mu=0.01$, $c=(\frac{1}{2})m$, $m=1500$, and AEE=100. That is, the value of cAEE is calculated in the following manner. That is, $$cAEE=(\frac{1}{2})\times1500\times100/8200=9.146341.$$

Further, for example, aT of the link 1 is calculated as aT=aD/v=21.42857, and bD of the link 1 is calculated by using the calculation of the coefficient b for the uphill. That is, $$bD=(mg/D)(\mu D\sqrt{(1-(D/H)^2)}+H)D=16.4879$$

As described above, the fuel consumption Q of each link is calculated, and, the route from the start place to the destination with the total fuel consumption Q being minimized is identified.

Figure 5B:
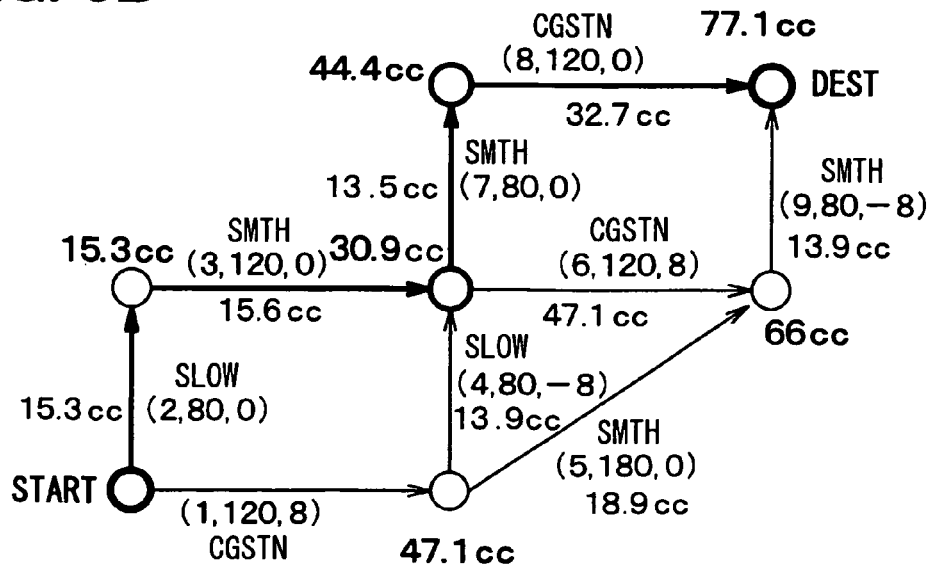

The fuel consumption of each link is shown in FIG. 5B. For example, the fuel consumption Q of the link 1 is 47.1 cc, and the fuel consumption Q of the link 2 is 15.3 cc. The fuel consumption minimized route is identified by combining the links from the start place to the destination. In the example, a route going through a link 2, a link 3, a link 7, and a link 8 is identified the carbon-minimum route (shown by a thick line in the drawing).

Then, at S300, the time-conscious routing is performed after the carbon-conscious routing is finished at S200 as shown in FIG. 2.

A flow chart of the time-conscious routing is shown in FIG. 7. First, the traffic jam information is acquired at S302, and, a cost for every link is calculated next at S304. More practically, the route cost of each link for reaching the destination from the start place is calculated. The calculation of the route cost in the time-conscious routing is a well-known technology. That is, for example, the route cost is calculated by adding a node cost to the travel time of each link.

Then, the route having the minimum total travel time is identified at S306. More practically, a route with the total travel time being minimized is searched for by Dijkstra method or the like, and the routing process is finished.

Then, the distance-conscious routing is performed at S400 after the time-conscious routing is finished as shown in FIG. 2.

FIG. 8 shows a flow chart of the distance-conscious routing process. In the distance-conscious routing, a cost of each link is calculated first at S402. More practically, the route cost of the route to the destination from the start place is calculated based on the cost of each link. The route cost calculation is the well-known technology that adds the number of traffic signs to the product of the link length multiplied by, for example, both of a road width coefficient and a road type coefficient.

Then, the total distance minimized route is identified at S404. More practically, a route that minimizes the total distance from the start place to the destination is searched for by the technique such as Dijkstra method, and the process is finished.

Figure 9:
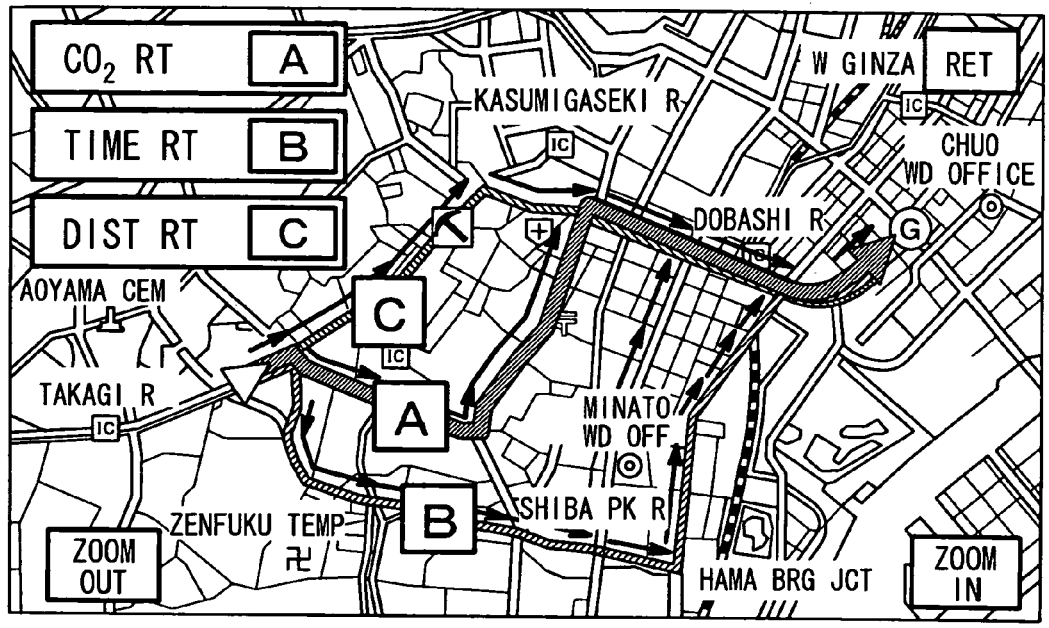
FIG. 9 shows an illustration of an example screen of a searched route by the route search process with a priority of the travel distance.

When the distance-conscious routing is finished at S400 as shown in FIG. 2, the searched route is displayed at S500. An example of the display screen of the display unit 18 is shown in FIG. 9. Currently, due to the priority assigned orderly to the carbon-minimum route A, a shortest-distance route B, and a shortest-time route C in the process at S102, the carbon-minimum route A is displayed on the map.

In addition, priority route selection buttons are shown in the upper left corner of the screen. The priority of route display is switched when the user choose one of those buttons by the operation of the remote controller 19a or the touch panel.

When the priority route is displayed, the process is finished. In this case, the travel guidance is provided along the priority route displayed on the screen after the process is finished.

In addition, the control circuit 21 in the present embodiment performs a carbon dioxide discharge comparison screen display process for displaying a comparison screen for comparing the total carbon dioxide discharge amounts in case that a comparison screen display button (not shown in the drawing) is selected when the carbon-minimum route A is displayed on the screen as shown in FIG. 9.

Figure 10:
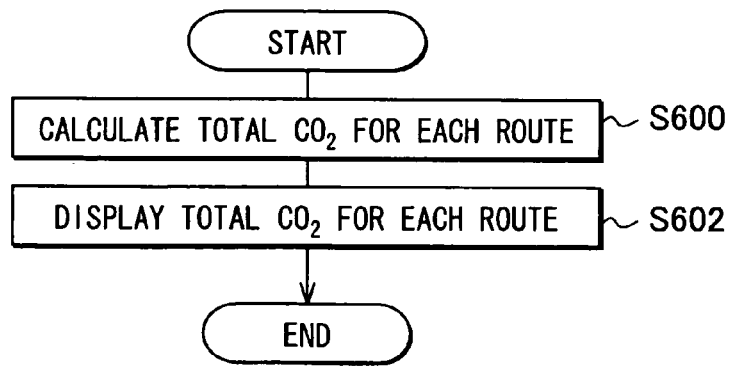
FIG. 10 shows a flow chart of a carbon dioxide discharge comparison screen display process.

FIG. 10 shows a flow chart of a carbon dioxide discharge comparison screen display process. In the display process, a total carbon dioxide discharge is calculated for each of the carbon-minimum route, the shortest-time route (i.e., a minimum time route), and the shortest-distance route (i.e., a minimum distance route) at S600. The total carbon dioxide discharge for each route can be calculated by using the equations 1 and 2 shown at S204 and S206 of FIG. 4.

Figure 11:
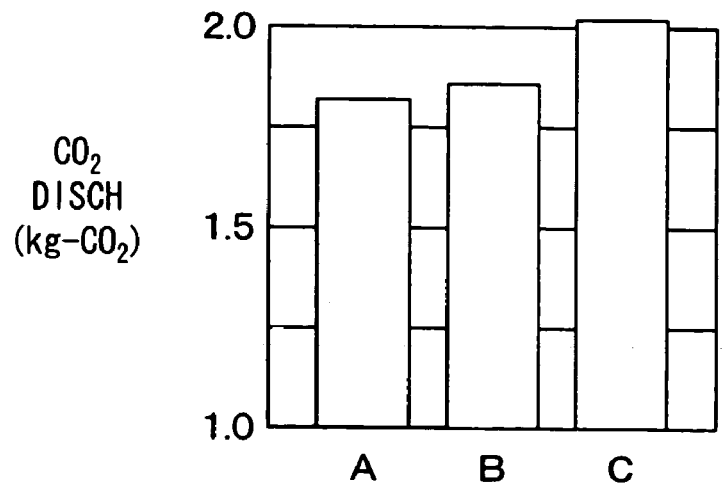
FIG. 11 shows an illustration of an example of a comparison screen of the carbon dioxide discharge.

The comparison screen of the carbon dioxide discharge is displayed next at S602. FIG. 11 shows an example of the carbon dioxide discharge comparison screen. As shown in the drawing, the display screen of the display unit 18 shows a comparison screen that compares the carbon dioxide discharge of the carbon-minimum route A, the shortest-distance route B, and the shortest-time route C by using a graph form. When the comparison screen is displayed in the above-described manner, the present process is finished.

In addition, the control circuit 21 in the present embodiment performs a travel time comparison screen display process for displaying a comparison screen for comparing the travel times in case that a travel time comparison screen display button (not shown in the drawing) is selected when the shortest-time route is displayed on the screen by the routing process in FIG. 2.

Figure 12:
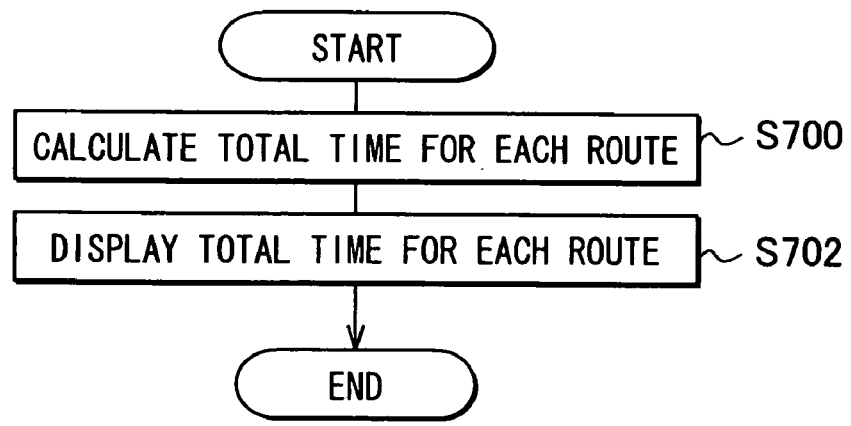
FIG. 12 shows a flow chart of a travel time comparison screen display process.

FIG. 12 shows a flow chart of the travel time comparison screen display process. In the display process, a total travel time is calculated for each of the carbon-minimum route, the shortest-time route, and the shortest-distance route at S700. The total travel time for each route can be calculated by using the technique shown at S304 and S306 of FIG. 7.

Figure 13:
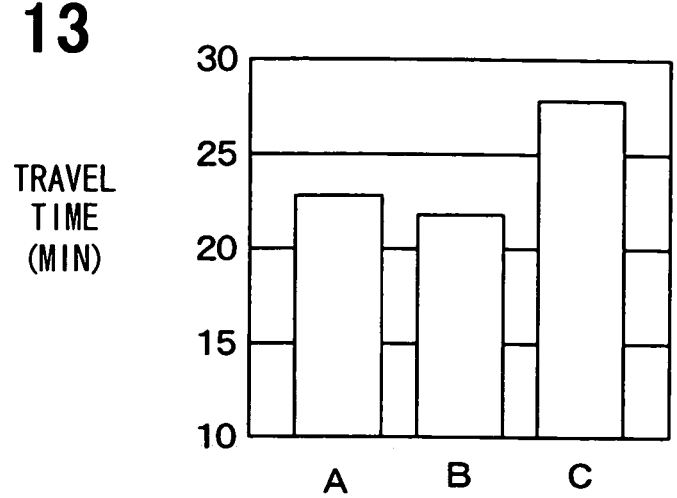
FIG. 13 shows an illustration of an example of a travel time comparison screen.

The comparison screen of the travel required is displayed next at S702. FIG. 13 shows an example of the travel time comparison screen. As shown in the drawing, the display screen of the display unit 18 shows a comparison screen that compares the travel time of the carbon-minimum route A, the shortest-distance route B, and the shortest-time route C by using a graph form. When the comparison screen is displayed in the above-described manner, the present process is finished.

In addition, the control circuit 21 in the present embodiment performs a travel distance comparison screen display process for displaying a comparison screen for comparing the travel distance in case that a travel distance comparison screen display button (not shown in the drawing) is selected when the shortest-distance route is displayed on the screen by the routing process in FIG. 2.

Figure 14:
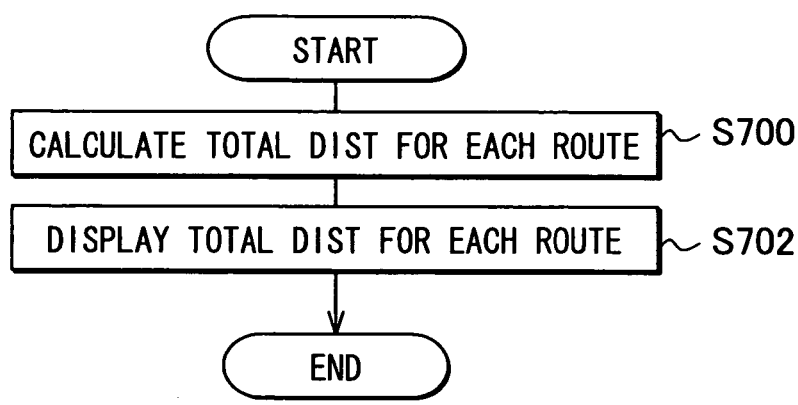
FIG. 14 shows a flow chart of a travel distance comparison screen display process.

FIG. 14 shows a flow chart of the travel distance comparison screen display process. In the display process, a total travel distance is calculated for each of the carbon-minimum route, the shortest-time route, and the shortest-distance route at S800. The total travel time for each route can be calculated by using the technique shown at S404 and S406 of FIG. 8.

Figure 15:
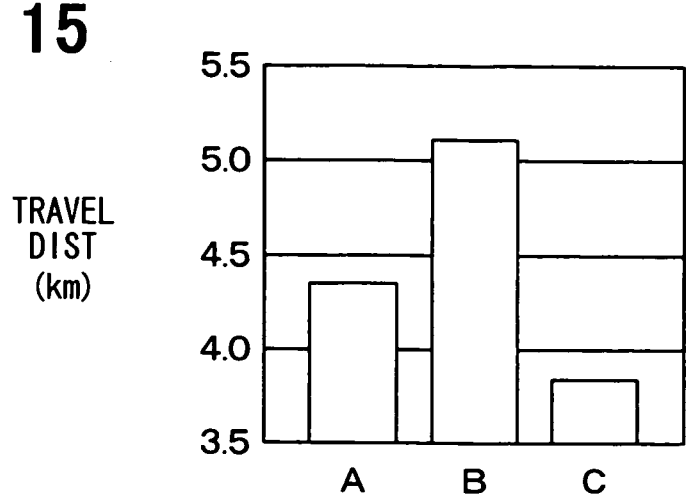
FIG. 15 shows an illustration of an example of a travel distance comparison screen.

The comparison screen of the travel required is displayed next at S802. FIG. 15 shows an example of the travel distance comparison screen. As shown in the drawing, the display screen of the display unit 18 shows a comparison screen that compares the travel distance of the carbon-minimum route A, the shortest-distance route B, and the shortest-time route C by using a graph form. When the comparison screen is displayed in the above-described manner, the present process is finished.

According to the configuration mentioned above, a coefficient that reflects the slope condition of each link is calculated based on the height difference between the both ends of each link memorized to the external memory 17, and the carbon dioxide discharge amount that changes in proportion to the distance of each link is calculated by multiplying the distance of each link by the coefficient together with both of the carbon dioxide discharge amount that changes in proportion to the travel time of each link and the carbon dioxide discharge amount based on an index that changes in proportion to the number of stops in each link. Those discharge amounts are added up to have the total carbon dioxide discharge amount of each link. In this manner, the carbon dioxide discharge amount is accurately calculated because the calculated carbon dioxide discharge amount quantitatively reflects the influence of the height difference.

Further, the routing process uses various evaluation values such as a travel time and a travel distance in the time-conscious routing and the distance conscious routing. That is, the evaluation values that are different from the carbon dioxide discharge amount are used for the routing process. Then, for each of the searched routes, the total carbon dioxide discharge amount for the route that extends from the start place to the destination is calculated and displayed on the screen in comparison to the total carbon dioxide discharge amount for the carbon-minimum route. Therefore, the carbon dioxide discharge amounts for each of the searched routes are easily compared with each other on the comparison screen.

Furthermore, the travel times of the searched routes are easily compared with each other because the travel time comparison screen for comparing the travel time between the start place and the destination of the carbon-minimum route and the travel time between the start place and the destination of the shortest-time route is displayed.

Furthermore, the travel distances of the searched routes are easily compared with each other because the travel distance comparison screen for comparing the travel distance between the start place and the destination of the carbon-minimum route and the travel distance between the start place and the destination of the shortest-distance route is displayed.

Although the present invention has been fully described in connection with the preferred embodiment thereof with reference to the accompanying drawings, it is to be noted that various changes and modifications will become apparent to those skilled in the art.

For example, though the value cAEE is calculated based on the assumption that the average speed of the link takes the value of v in the above embodiment, the average speed v may be changed to a smaller value for the link that has the increased number of traffic signals for the calculation of cAEE. This is because the average speed v changes in proportion to the number of stops in the link. In addition, the average speed may be increased for a multiple lane road in comparison to a single lane road. This is because the number of stops at the traffic signals is increased in the single lane road with a lead vehicle in front traveling at a slow speed in comparison to a situation of the multiple lane road where the slow lead vehicle can be passed by for relatively fewer stops at the traffic signals. Further, when the split time (i.e., time for yellow and green signals) in the traffic signal cycle is longer, the average speed may be changed to a smaller value.

Furthermore, though the calculation of the total carbon dioxide discharge is based on the carbon dioxide discharge of each link added up from the start place to the destination after calculating the fuel consumption of each link and multiplying the fuel consumption by the conversion coefficient Ec for having the discharge of each link in the above embodiment, the total carbon dioxide discharge may be, for example, calculated by adding up the fuel consumption of each link from the start place to the destination to have the total fuel consumption and by multiplying the total fuel consumption by the conversion coefficient Ec for the calculation of the total carbon dioxide discharge.

Furthermore, though the carbon-minimum route is searched for in the above embodiment, a fuel-minimum route that minimizes the fuel consumption between the start place and the destination may be searched for as the carbon-minimum route.

Furthermore, though the coefficient b is calculated based on the height difference H of the both ends of each link memorized to the external memory 17 in the course of calculation of the fuel consumption Q in the above embodiment, the coefficient b may be calculated, for example, based on altitude information of both ends of each link stored in the external memory 17 in the course of calculation of the fuel consumption Q.

Furthermore, though the carbon-minimum route is compared with the shortest-time route and the shortest-distance route in the carbon dioxide discharge comparison screen display process in FIG. 10, the travel time comparison screen display process in FIG. 12, and the travel distance comparison screen display process in FIG. 14 in the above embodiment, the carbon-minimum route may be compared, for example, in a comparison screen displayed for comparison with routes that are searched for in a process such as a local road search process for prioritizing a route through local roads, an expressway search process for prioritizing a route through expressways, or a different route search process for prioritizing a route that is different from an already-searched route.

Correspondence between the components in the present embodiment and claim language is shown in the following. That is, S204 is equivalent to a calculation unit, and S206 is equivalent to a carbon-conscious routing unit, and the external memory 17 is equivalent to a memory unit, and a time-conscious routing/distance-conscious routing/local road search/expressway search process are equivalent to a route search unit, and S600 is equivalent to a carbon discharge calculation unit, and S602 is equivalent to a discharge amount display unit, and a time-conscious routing process is equivalent to a time-conscious routing unit, and S700 is equivalent to a travel time calculation unit, and S702 is equivalent to a travel time display unit, and a distance-conscious routing process is equivalent to a distance-conscious routing unit, and S800 is equivalent to a travel distance calculation unit, and S802 is equivalent to a travel distance display unit.

What is claimed is:
1. A route search apparatus comprising:
   a calculation unit configured to calculate a carbon dioxide discharge amount discharged from an internal combustion engine of a vehicle per section in a route from a start place to a destination;
   a carbon-conscious routing unit configured to search a carbon-minimum route that minimizes the carbon dioxide discharge amount in the route from the start place to the destination based on a calculation by the calculation unit; and a memory unit configured to memorize altitude information that represents an altitude difference between both ends of each section in the route, the calculation unit is further configured to
- determine for each section a slope coefficient that reflects a slope condition of each section based on the altitude difference of the memory unit,
- variably identify the carbon dioxide discharge amount for each section by multiplying a section distance of each section by the slope coefficient,
- variably identify the carbon dioxide discharge amount based on a travel time of the vehicle in each section, and
- variably identify the carbon dioxide discharge amount based on an index that changes according to a number of stops in each section,
- determine the carbon dioxide discharge amount for each section based on a fuel consumption amount, Q, that is defined as $Q=aT+bD+cAEE$, wherein a is a fuel type-displacement coefficient, T represents the travel time of each section, b is a road slope condition reflecting index, D represents the section distance, c is vehicle weight coefficient, and AEE represents an acceleration energy, and
- calculate a total carbon dioxide discharge amount for each section by adding each of identified carbon dioxide discharge amounts.

2. The route search apparatus of claim 1, wherein the calculation unit is further configured to calculate the road slope condition reflecting index b by employing a friction index of $\mu$, a vehicle weight of m, a gravitational acceleration of g, and an equation $b=\mu mg$ when the calculation unit determines that the section is flat based on the altitude difference between both ends of the section.

3. The route search apparatus of claim 1, wherein the calculation unit is further configured to calculate the road slope condition reflecting index $b=(mg/D)(\mu D\sqrt{1-(H/D)^2}+H)$ by employing a friction index of $\mu$, a vehicle weight of m, a gravitational acceleration of g, the section distance of D, a section altitude difference of H, and an equation $b=(mg/D)(\mu D\sqrt{1-(H/D)^2}+H)$ when the calculation unit determines that the section is uphill based on the altitude difference between both ends of the section.

4. The route search apparatus of claim 1, wherein, when the calculation unit determines that the section is downhill based on the altitude difference between both ends of the section, the calculation unit is further configured to calculate the road slope condition reflecting index b by employing a friction index of $\mu$, a vehicle weight of m, a gravitational acceleration of g, the section distance of D, a section altitude difference of H in addition to an equation $b=(mg/D)(\mu D\sqrt{1-(H/D)^2}-H)$ if $\mu mgL$ is equal to or greater than mgH, and when the calculation unit determines that the section is downhill based on the altitude difference between both ends of the section, the calculation unit is further configured to use a value of zero for the road slope condition reflecting index b if $\mu mgL$ is smaller than mgH.

5. The route search apparatus of claim 1, wherein, the calculation unit is further configured to calculate the carbon dioxide discharge amount that varies according to the travel time of each section by multiplying an index that is determined in association with displacement of the internal combustion engine of the vehicle and a fuel type by the travel time of each section.

6. The route search apparatus of claim 1 further comprising:
- a route search unit configured to search an optimum route from the start place to the destination that minimizes an evaluation value based on the evaluation value that is different from the carbon dioxide discharge amount;
- a carbon discharge calculation unit configured to calculate a total carbon dioxide discharge amount for the optimum route searched by the route search unit; and
- a discharge amount display unit configured to display a comparison screen that compares the total carbon dioxide discharge amount for the optimum route searched by the route search unit and the total carbon dioxide discharge amount for the carbon-minimum route searched by the carbon-conscious routing unit.

7. The route search apparatus of claim 1 further comprising:
- a time-conscious routing unit configured to search a shortest route that minimizes a travel time from the start place to the destination;
- a travel time calculation unit configured to calculate a travel time between the start place to the destination for the carbon-minimum route searched by the carbon-conscious routing unit; and
- a travel time display unit configured to display a comparison screen that compares a travel time from the start place to the destination for the carbon-minimum route calculated by the travel time calculation unit and a travel time from the start place to the destination for the shortest route calculated by the time-conscious routing unit.

8. The route search apparatus of claim 1 further comprising:
- a distance-conscious routing unit configured to search a shortest route that minimizes a travel distance from the start place to the destination;
- a travel distance calculation unit configured to calculate a travel distance between the start place to the destination for the carbon-minimum route searched by the carbon-conscious routing unit; and
- a travel distance display unit configured to display a comparison screen that compares comparing a travel distance from the start place to the destination for the carbon-minimum route calculated by the travel distance calculation unit and a travel distance from the start place to the destination for the shortest route calculated by the distance-conscious routing unit.

* * * * *